United States Patent
McCullough

(10) Patent No.: US 7,251,687 B1
(45) Date of Patent: Jul. 31, 2007

(54) METHOD FOR CLICK-STREAM ANALYSIS USING WEB DIRECTORY REVERSE CATEGORIZATION

(75) Inventor: Sean M. McCullough, Austin, TX (US)

(73) Assignee: Vignette Corporation, Austin, TX (US)

( * ) Notice: Subject to any disclaimer, the term of this patent is extended or adjusted under 35 U.S.C. 154(b) by 425 days.

(21) Appl. No.: 09/681,760

(22) Filed: May 31, 2001

Related U.S. Application Data

(60) Provisional application No. 60/208,889, filed on Jun. 2, 2000, provisional application No. 60/208,890, filed on Jun. 2, 2000.

(51) Int. Cl.
G06F 15/173 (2006.01)
G06F 7/00 (2006.01)

(52) U.S. Cl. ............ 709/224; 709/223; 709/225; 709/229; 709/245; 707/3; 707/5; 707/10; 707/100

(58) Field of Classification Search ............ 709/223, 709/229, 225, 245, 219; 707/3, 5, 10, 100
See application file for complete search history.

(56) References Cited

U.S. PATENT DOCUMENTS

| | | | |
|---|---|---|---|
| 4,754,428 A | 6/1988 | Schultz et al. ............ 709/246 |
| 4,811,207 A | 3/1989 | Hikita et al. ............ 707/2 |
| 5,210,824 A | 5/1993 | Putz et al. ............ 707/523 |
| 5,212,787 A | 5/1993 | Baker et al. ............ 707/101 |
| 5,226,161 A | 7/1993 | Khoyi et al. ............ 709/316 |
| 5,257,369 A | 10/1993 | Skeen et al. ............ 709/312 |
| 5,331,673 A | 7/1994 | Elko et al. ............ 714/43 |
| 5,339,392 A | 8/1994 | Risberg et al. ............ 345/762 |
| 5,421,015 A | 5/1995 | Khoyi et al. ............ 709/107 |
| 5,557,717 A | 9/1996 | Wayner |
| 5,572,643 A | 11/1996 | Judson ............ 709/218 |
| 5,704,017 A | 12/1997 | Heckerman et al. ............ 395/61 |
| 5,727,129 A | 3/1998 | Barrett et al. ............ 706/10 |
| 5,732,218 A * | 3/1998 | Bland et al. ............ 709/224 |
| 5,740,430 A | 4/1998 | Rosenberg et al. ............ 395/616 |
| 5,761,416 A | 6/1998 | Mandal et al. ............ 395/200 |
| 5,774,660 A | 6/1998 | Brendel et al. ............ 395/200 |
| 5,790,426 A | 8/1998 | Robinson ............ 364/554 |
| 5,790,790 A | 8/1998 | Smith et al. ............ 395/200 |

(Continued)

OTHER PUBLICATIONS

Discount Store News, "Datasage Customer Analyst," 1998.

(Continued)

*Primary Examiner*—Nathan J. Flynn
*Assistant Examiner*—Ashok Patel
(74) *Attorney, Agent, or Firm*—Sprinkle IP Law Group

(57) ABSTRACT

A method can be used to profile a user using network addresses, category information, and corresponding temporal information when the user requested or received information from those network addresses. A table can be created that includes the user identifier, category information, and temporal information. The user profile can be generated and based at least in part on the user identifier, category information, and at least some of the temporal information. In a specific embodiment, the user identifier, network addresses, and timestamps may be the only source of user information. Embodiments can also include data processing system readable media having code to perform at least part of the methods. The methods and data processing system media can be implemented without having to generate complex code or rely on user provided information.

22 Claims, 3 Drawing Sheets

U.S. PATENT DOCUMENTS

| | | | |
|---|---|---|---|
| 5,796,952 A * | 8/1998 | Davis et al. | 709/224 |
| 5,870,559 A | 2/1999 | Leshem et al. | 709/224 |
| 5,878,223 A | 3/1999 | Becker et al. | 709/223 |
| 5,884,282 A | 3/1999 | Robinson | 705/27 |
| 5,918,014 A | 6/1999 | Robinson | 395/200.49 |
| 5,958,008 A | 9/1999 | Pogrebisky et al. | 709/223 |
| 6,012,052 A | 1/2000 | Altschuler et al. | 707/2 |
| 6,041,311 A | 3/2000 | Chislenko et al. | 705/27 |
| 6,041,335 A | 3/2000 | Merritt et al. | |
| 6,049,777 A | 4/2000 | Sheena et al. | 705/10 |
| 6,067,565 A | 5/2000 | Horvitz | 709/218 |
| 6,085,226 A | 7/2000 | Horvitz | 709/203 |
| 6,092,049 A | 7/2000 | Chislenko et al. | 705/10 |
| 6,094,662 A | 7/2000 | Hawes | 707/104 |
| 6,112,186 A * | 8/2000 | Bergh et al. | 705/10 |
| 6,112,279 A | 8/2000 | Wang | 711/119 |
| 6,119,103 A | 9/2000 | Basch et al. | |
| 6,128,655 A | 10/2000 | Fields et al. | 709/219 |
| 6,128,663 A * | 10/2000 | Thomas | 709/228 |
| 6,138,141 A | 10/2000 | DeSimone et al. | 709/203 |
| 6,138,156 A * | 10/2000 | Fletcher et al. | 709/224 |
| 6,141,737 A | 10/2000 | Krantz et al. | 711/171 |
| 6,144,962 A | 11/2000 | Weinberg et al. | |
| 6,178,419 B1 * | 1/2001 | Legh-Smith et al. | 707/6 |
| 6,185,586 B1 | 2/2001 | Judson | 707/513 |
| 6,185,608 B1 | 2/2001 | Hon et al. | 709/219 |
| 6,199,067 B1 * | 3/2001 | Geller | 707/10 |
| 6,205,472 B1 * | 3/2001 | Gilmour | 709/206 |
| 6,286,043 B1 * | 9/2001 | Cuomo et al. | 709/223 |
| 6,321,206 B1 | 11/2001 | Honarvar | |
| 6,430,539 B1 | 8/2002 | Lazarus et al. | |
| 6,456,305 B1 | 9/2002 | Qureshi et al. | |
| 6,509,898 B2 | 1/2003 | Chi et al. | |
| 6,559,882 B1 * | 5/2003 | Kerchner | 348/61 |
| 6,606,657 B1 | 8/2003 | Zilberstein et al. | |
| 6,629,136 B1 * | 9/2003 | Naidoo | 709/219 |
| 6,640,215 B1 | 10/2003 | Galperin et al. | |
| 6,691,106 B1 * | 2/2004 | Sathyanarayan | 707/3 |
| 6,732,331 B1 | 5/2004 | Alexander | |
| 6,757,740 B1 * | 6/2004 | Parekh et al. | 709/245 |
| 6,839,682 B1 | 1/2005 | Blume et al. | |
| 2001/0037321 A1 | 11/2001 | Fishman et al. | |
| 2002/0108121 A1 * | 8/2002 | Alao et al. | 725/110 |
| 2005/0261965 A1 * | 11/2005 | Eisen et al. | 705/14 |

OTHER PUBLICATIONS

Montgoemry, et al., "Estimating Price Elasticities with Theory-Based Priors," J. Marketing Research, vol. 36, pp. 413-423, 1999.

Simon, "Price Management," Elsevier Sci Pub, pp. 13-41, 1989.

Subrahmanyan and Shoemaker, "Developing Optimal Pricing and Inventory Policies for Retailers Who Face Uncertain Demand," J. Retailing, vol. 72, pp. 7-30, 1996.

Vilcassim and Chintagunta, "Investigating Retailer Product Category Pricing from Household Scanner Panel Data," J. Retailing, vol. 71, pp. 103-128, 1995.

Weinstein, "Tackling Technology," Progressive Grocer, 1999.

Wellman, "Down in the (Data) Mines," Supermarket Business, pp. 33-35, 1999.

RT News, "New Customer Management System Returns Lost Sales to Dick's," RT Magazine, 1999.

DataSage, Inc., "DataSage Customer Analyst," Progressive Grocer, 1998.

Miller, M., "Applications Integration-Getting It Together," PC Magazine, Feb. 8, 1994, pp. 111-112, 116-120, 136, 138.

PointCast 2.0 Eases Burden on Network, 3 pp., Jun. 2, 1997.

Strom, David, The Best of Push, 7 pp., Apr. 1997.

When Shove Comes to Push, 7u pp., Feb. 10, 1997.

thirdvoice.com—Home Page and Frequently Asked Questions (7 pages), www.thirdvoice.com, www.thirdvoice.com/help.20/faq.htm, 2000.

Kitts, "An Evaluation of Customer Retention and Revenue Forecasting in the Retail Sector: Investigation into the Effects of Seasonality, Spending and Method" by DataSage,Inc., Oct. 25, 1999, 63 pages.

Kitts, "RMS Revenue and Retention Forecasting Final Phase Model Specification" by DataSage, Inc., Jan. 31, 2000, 16 pages.

Cabena, Peter et al., Intelligent Miner for Data Applications Guide, IBM RedBook SG24-5252-00, Mar. 1999.

Datasage.com News and Events—DataSage Releases netCustomer, the 1st Individualization Solution for E-Commerce, retrieved Feb. 16, 2005 from Archive.org , 3 pgs, Aug. 2, 1999.

Datasage.com—Executive Overview—Retail, Retail Data Mining Executive Overview, retrieved Feb. 16, 2005 from Archive.org, 7 pgs, Dec. 1998.

Gallant, Steve et al., Successful Customer Relationship Management in Financial Applications (Tutorial PM-1), Conference on Knowledge Discovery in Data, ISBN:1-58113-305-7, pp. 165-241, 2000.

Vignette Corporation to Acquire DataSage, Inc., retrieved from Archive.org Feb. 16, 2005, 3 pgs, Jan. 10, 2000.

Chapman, Pete et al., CRISP-DM 1.0—Step-by-step data mining guide, retrieved from www.crisp-dm.org Feb. 17, 2005, pp. 1-78, 2000.

XSL Transformations (XSLT) Version 1.0, W3C Recommendation, www.w3.org/TR/1999/REC-xslt-19991116, pp. 1-87, Nov. 16, 1999.

* cited by examiner

METHOD FOR CLICK-STREAM ANALYSIS USING WEB DIRECTORY REVERSE CATEGORIZATION

CROSS REFERENCE TO RELATED APPLICATIONS

This application claims priority under 35 U.S.C. § 119(e) to U.S. Patent Application No. 60/208,889 entitled "Method For Click-Stream Analysis Using Web Directory Reverse Categorization" by McCullough filed Jun. 2, 2000, and U.S. Patent Application No. 60/208,890 entitled "Method For Continuous, Frame-Specific Click-Stream Recording" by McCullough Jun. 2, 2000. This is also related to U.S. patent application Ser. No. 09/681,758, now U.S. Pat. No. 7,155,506, entitled "Method For Continuous, Frame-Specific Click-Stream Recording" by McCullough filed of even date. All applications listed in this paragraph and are assigned to the current assignee hereof and are incorporated herein by reference.

BACKGROUND OF INVENTION

1. Field of the Invention

This invention relates in general to methods and data processing system readable media, and more particularly, to methods of profiling a user and data processing system readable media for carrying out those methods.

2. Description of the Related Art

Many different Internet Service Providers ("ISPs") or sites are interested in creating or using profiles of their users. One way to obtain a profile for a user is to rely on information that the user may voluntarily provide. One problem with this is that the user may lie or give inaccurate, misleading, or incomplete data regarding himself or herself.

Another attempt at establishing a profile for a user may include reviewing the Internet Protocol ("IP") address of the user and determining the geographic location and time zone for the user. However, that information may be misleading depending upon the ISP and where it is located. For example, if the user is using America Online, the user may be listed as residing in Virginia and being in the Eastern Time zone. In reality, the user may be in a different country and residing within a time zone many hours different from the Eastern Time zone. Additionally, many different users may be using the same computer (same IP address). Clearly, such information is of little use in determining interests or other information regarding an individual. Even if the information regarding state and time zone are correct and only one user is using a specific IP address with a local ISP, this may yield little useful information about the individual user. The ISP may have thousands or millions of users.

SUMMARY OF INVENTION

A user profile can be generated using a table that tracks a user by category information and temporal information. In one embodiment, the user profile can be generated with relatively minimal resources and relies on the user behavior rather than information provided by the user or just the IP address. In one configuration, a network access provider or network site may track a user's network addresses by timestamp and correlate the network addresses to meta tags for the network address that are obtained for free or using a third party source. A table including a user identifier, corresponding category, and timestamp may provide a basis for forming a user profile.

In one set of embodiments, a method of profiling a user can comprise accessing first data including a first identifier for the user, network addresses accessed by the user, and temporal information related to the user identifier and the network addresses. The method can also comprise accessing second data including at least some the network addresses and corresponding category information for each of those network addresses. The method can further comprise generating a user profile based at least in part on the first identifier, category information, and at least some of the temporal information.

In a specific embodiment, generating the user profile can include creating a table (third data), comparing the data for the user within the table to existing profiles, and associating the user with a particular profile. In another embodiment, the method can further comprise selecting marketing information regarding an item, where the selection is based at least in part on the user profile, and sending the marketing information to the user. In still another embodiment, the user profile can be sold.

In other embodiments, a data processing system readable medium can have code embodied within it. The code can include instructions executable by a data processing system. The instructions may be configured to cause the data processing system to perform the methods described herein.

The foregoing general description and the following detailed description are exemplary and explanatory only are not restrictive of the invention, as claimed.

BRIEF DESCRIPTION OF DRAWINGS

The present invention is illustrated by way of example and not limitation in the accompanying figures, in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A method can be used to profile a user using network addresses and temporal information of the network addresses when the user requests or is sent information for those network addresses. The method can comprise accessing first data including a user identifier, network addresses accessed by the user, and temporal information. The method can also comprise accessing second data including at least some of the network addresses and corresponding category information for each of those network addresses. The method can further comprise generating the user profile based at least in part on the user identifier, category information, and at least some of the temporal information.

A few terms are defined or clarified to aid in understanding the descriptions that follow. A network includes an interconnected set of server and client computers over a publicly available medium (e.g., the internet) or over an internal (company-owned) system. A user at a client computer may gain access to the network using a network access provider. An Internet Service Provider ("ISP") is a common type of network access provider. A network address includes information that can be used by a server computer to locate information, whether internal to that server computer or at a different, remote computer or database. URLs are examples of network addresses. A network site corresponds to a location specified by a network address. A web site is a common type of network site. Note that the examples given within this paragraph are for purposes of illustration and not limitation.

Figure 1:
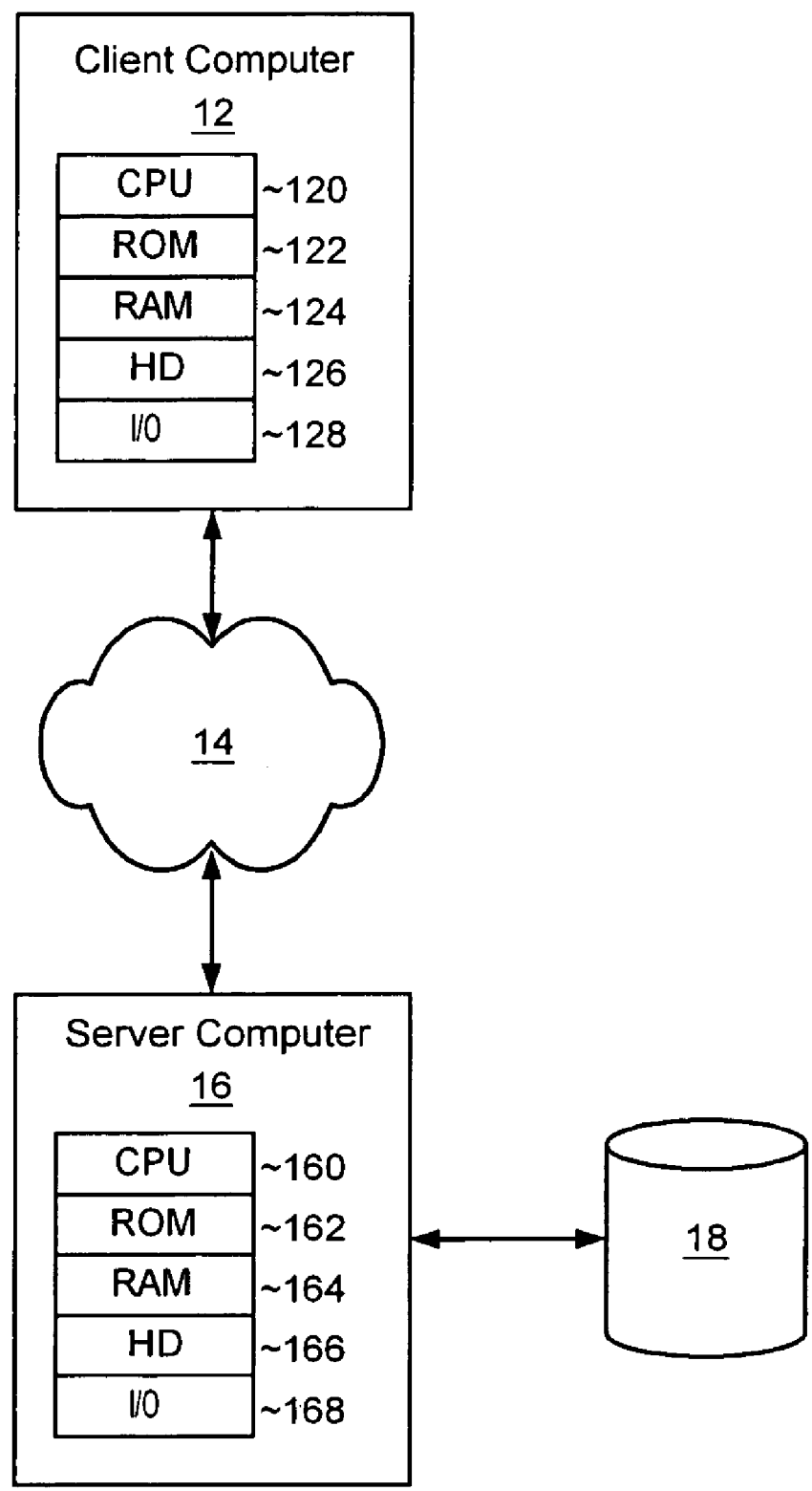
FIG. 1 includes an illustration of a hardware architecture for carrying out methods of profiling a user.

Before discussing details of embodiments of present invention, a hardware architecture for using embodiments is described. FIG. 1 illustrates an exemplary architecture and includes a client computer 12 that is bi-directionally coupled to a network 14, and a server computer 16 that is bi-directionally coupled to the network 14 and database 18. The client computer 12 includes a central processing unit ("CPU") 120, a read-only memory ("ROM") 122, a random access memory ("RAM") 124, a hard drive ("HD") or storage memory 126, and input/output device (s) ("I/O") 128. The I/O devices 128 can include a keyboard, monitor, printer, electronic pointing device (e.g., mouse, trackball, etc.), or the like. The server computer 16 can include a CPU 160, ROM 162, RAM 164, HD 166, and I/O 168.

Each of the client computer 12 and the server computer 16 is an example of a data processing system. ROM 122 and 162, RAM 124 and 164, HD 126 and 166, and the database 18 include media that can be read by the CPU 120 or 160. Therefore, each of these types of memories includes a data processing system readable medium. These memories may be internal or external to the computers 12 and 16.

Figure 2:
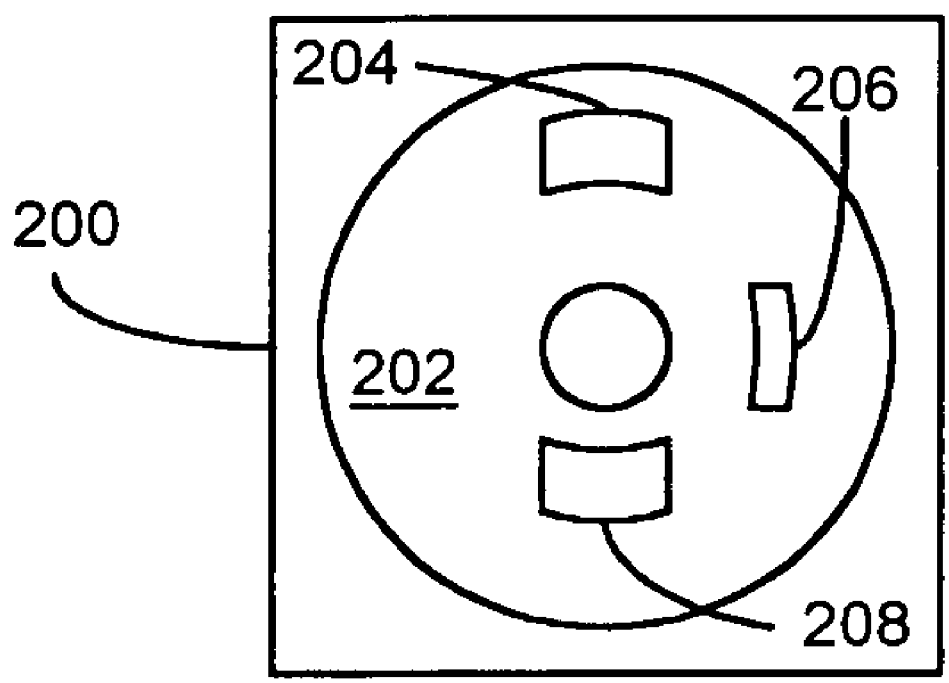
FIG. 2 includes an illustration of a data processing system readable medium including software code.

The methods described herein may be implemented in suitable software code that can reside within ROM 122 or 162, RAM 124 or 164, or HD 126 or 166. FIG. 2 illustrates a combination of software code elements 204, 206, and 208 that are embodied within a data processing system readable medium 202 on HD 166. In addition to those types of memories previously described, the instructions in an embodiment of the present invention may be contained on a data storage device with a different data processing system readable storage medium. The instructions may be stored as software code elements on a DASD array, magnetic tape, floppy diskette, electronic read-only memory, optical storage device, CD ROM or other appropriate data processing system readable medium or storage device.

Figure 3:
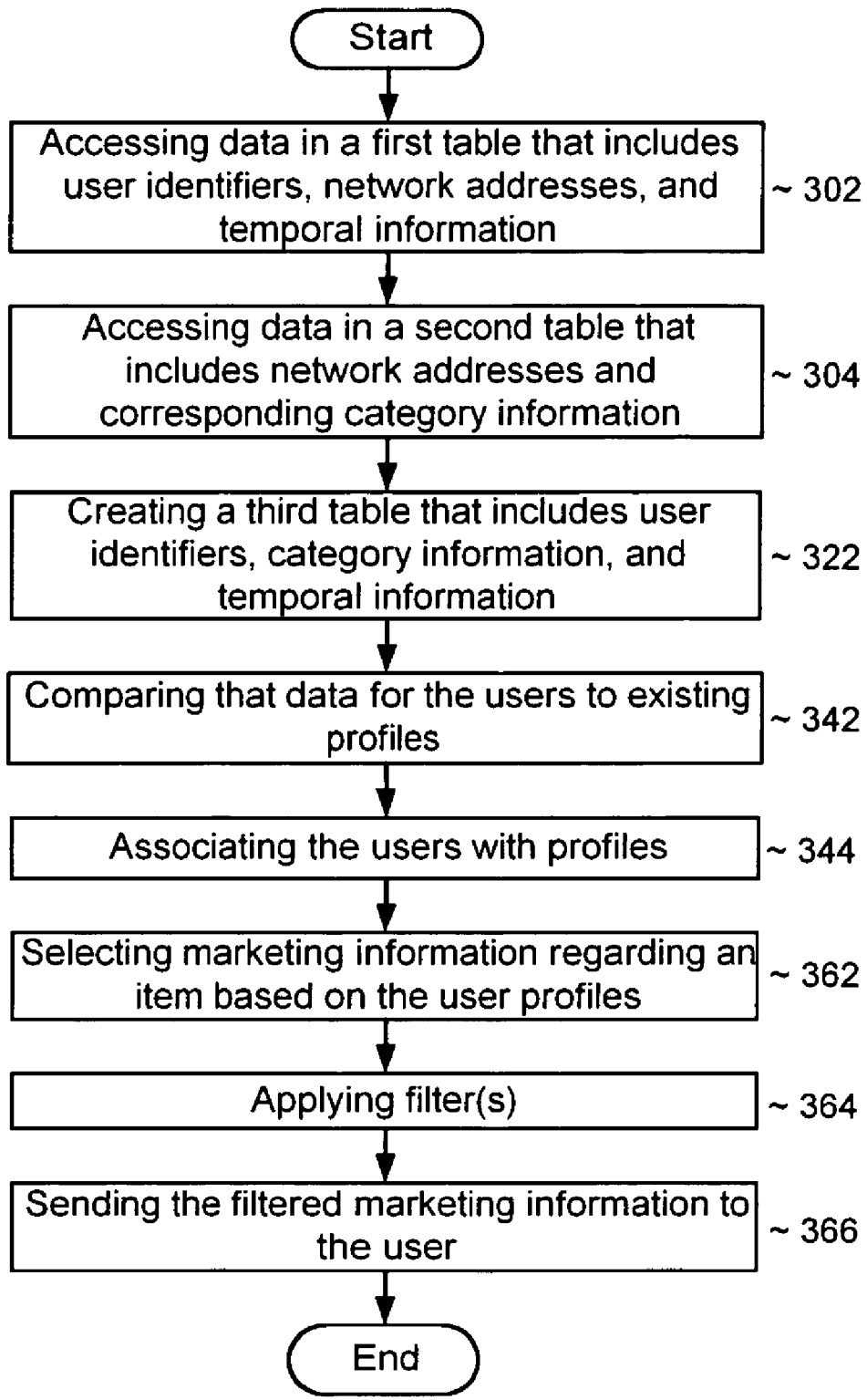
FIG. 3 includes a process flow diagram illustrating generation and use of a user profile.

In an illustrative embodiment of the invention, the computer-executable instructions may be lines of compiled C++, Java, or other language code. Other architectures may be used. For example, the functions of the client computer 12 may be incorporated into the server computer 16, and vice versa. In alternative embodiments, more server computers can be used, such that the functions of server computer 16 are performed by a combination of server computers. FIG. 3 includes an illustration, in the form of a flow diagram, of the structure of such a software program.

Communications between the client computer 12 and the server computer 16 can be accomplished using radio frequency, electronic, or optical signals. When a user (human) is at the client computer 12, the client computer 12 may convert the signals to a human understandable form when sending a communication to the user and may convert input from the user to appropriate signals to be used by the client computer 12 or the server computer 16.

Attention is now directed to methods of profiling users as illustrated in FIG. 3. The method can comprise accessing data in a first table that includes user identifiers, network addresses, and temporal information (block 302). The first table is typically part of the database 18. The first table may be organized in rows and columns. The columns may correspond to user identifiers, network addresses, temporal information, and the like. The rows may include an entry for each time a network address is requested by users. Note that the network addresses may be for different network domains of different companies that do not significantly own or control one another (i.e., no more than approximately 10% ownership of a company or voting shares of the company).

In one embodiment, a user can "surf" the network on client computer 12, while the server computer 16 collects and stores the user identifier, network addresses, and timestamps within the first table in the database 18. The user may be routed to other server computers (not shown) that correspond to the network sites requested by the user at client computer 12. The server computer 16 may access and read the information within the first table within database 18. Other users (not shown) may be using the network 14 and server computer 16.

The method can also comprise accessing data in a second table that includes network addresses and corresponding category information (304). This act may be performed by the server computer 16 in one embodiment. The data for the second table may reside in the storage device 18 or, alternatively, may reside within a database at an external location of a third party (not shown). For example, the second table may be part of the Netscape Open Directory Project or may be provided by LookSmart, Ltd. of San Francisco, Calif. Either of these third-party sources may provide a categorization of each Internet site. The categorization may be in the form of meta tags, which are metadata that correspond to the network addresses. Skilled artisans may realize that meta tags are used by search engines, such as Yahoo!, Lycos, Excite, and the like in performing user specified searches for information. To the inventor's knowledge, the meta tags for the search engines have not been used in generating user profiles. A short text portion of a URL may optionally be used. In any event, a table of network addresses and categories can be created or accessed using a third-party source that is different from the user and the party that significantly owns or controls the server computer 16.

The method can further include creating a third table that includes user identifiers, category information, and temporal information as shown in block 322. The table can be created by matching the network addresses in the first and second tables. Other information may be included within the third table. In one embodiment, the third table can sort by user identifier and time to show categories in chronological or reverse chronological order.

Different method may be used to generate the user profile. The methods described herein are only to illustrate and not limit the present invention. In one embodiment, the information in the third table can be used in generating a user profile by performing click-stream analysis. To generate the user profile, the data within the third table can be compared to existing profiles (block 342). The existing profiles can represent another person or can represent a theoretical individual having attributes similar to a person. For each user, his or her information from the third table can be compared to the existing profiles. The method can also include associating each of the users with a profile that most closely matches that particular user (block 344). Alternatively, data mining rules may be used to determine the characteristics of the user, and the user profile may include a set of discrete, but potentially interrelated, characteristics.

The information gathered may be used in wide variety of ways. The examples described below are meant to illustrate and not limit the present invention. In one embodiment, the information may be useful for providing information or offering an item to the user. As used herein, "item" means a product or a service. The method can include selecting marketing information regarding an item based on the user profiles (block 362). The marketing information may vary widely from embodiment to embodiment. In one embodiment, the marketing information may include banner advertisements that may be displayed near a periphery of a view as seen by the user on I/O 128 of client computer 12. A network access provider may perform the selection of the banner advertisements. Alternatively, network sites may be owned or controlled by a company that sells the item. In this example, the marketing information may comprise an offer to sell the item to the user.

The method can further comprise applying one or more filters as shown in block 364. These filters can be used to remove information that may have been previously seen by the user, to remove information regarding some items having lower profit margins from a collection of items, to remove information that may be offensive or objectionable to be user, or the like. The method can further comprise an optional act of sending the filtering marketing information to the user as shown in block 366.

In another embodiment, a company creating user profiles using data within the tables may sell the user profiles to a marketing company, a mailing service, or other third party. Alternatively, the information can be used in performing internal analytics within the company. After reading this specification, skilled artisans appreciate that the number and variety of uses of the user profiles is nearly limitless.

Embodiments of the present invention may allow creation of a user profile without having to rely on the user for his or her input or having to rely upon information only within a HyperText Transfer Protocol (HTTP) stream, such as an IP address. The click stream may be the only source of user information used for the profile. Solely by a using a user's chronological click stream and network address categorization, a reasonably accurate user profile can be obtained for an individual at a reasonably low cost without complex software code requirements.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of profiling a user comprising:
   accessing first data including a first identifier associated with the user, network addresses accessed by the user, and temporal information related to the user identifier and the network addresses, wherein the first data is determined at a first location remote from the user;
   accessing second data at a second location remote from the user and the network addresses, wherein accessing the second data further comprises sending at least some of the network addresses to the second location and receiving corresponding category information for each of the at least some network addresses, the corresponding category information including at least one meta tag;
   generating a user profile based at least in part on the first identifier, corresponding category information, and at least some of the temporal information by creating a table that includes a first column for user identifiers including the first identifier, a second column for the corresponding category information including at least one meta tag, and a third column for the at least some of the temporal information;
   comparing data for the user within the table to existing profiles including a first profile; and
   associating the user with the first profile.

2. The method of claim 1, further comprising:
   selecting a first marketing information regarding an item, wherein selecting is based at least in part on the user profile; and
   sending the first marketing information to the user.

3. The method of claim 2, wherein:
   selecting is performed by a network access provider; and
   the first marketing information includes a banner advertisement that is to be displayed near a periphery of a view.

4. The method of claim 2, wherein:
   at least one of the network addresses corresponds to a network site is owned or controlled by a company that sells the item; and
   the first marketing information comprises an offer to sell the item.

5. The method of claim 2, wherein:
   selecting comprises selecting the first marketing information and a second marketing information; and
   the method further comprises applying a filter, wherein:
      the second marketing information is filtered out and the first marketing information passes; and
      applying the filter is performed before sending.

6. The method of claim 1, further comprising selling the user profile.

7. The method of claim 1, wherein:
   accessing the second data comprises accessing the corresponding category information from a third-party source; and
   the corresponding category information includes meta tags for the network addresses.

8. The method of claim 1, wherein the at least one meta tag is included in code associated with at least one of the network addresses.

9. The method of claim 8, wherein the category information is sorted in chronological order.

10. The method of claim 1, wherein comparing data for the user within the table to existing profiles includes performing click stream analysis.

11. The method of claim 1, wherein comparing data for the user within the table to existing profiles includes:

applying data mining rules to the data for the user to determine characteristics of the user; and comparing the characteristics of the user to characteristics included in the existing profiles.

12. A data processing system readable medium having code embodied therein, the code including instructions executable by a data processing system, wherein the instructions are configured to cause the data processing system to perform a method of profiling a user, the method comprising:

accessing first data including a first identifier associated with the user, network addresses accessed by the user, and temporal information related to the user identifier and the network addresses, wherein the first data is determined at a first location remote from the user;

accessing second data at a second location remote from the user and the network addresses, wherein accessing the second data further comprises sending at least some of the network addresses to the second location and receiving corresponding category information for each of the at least some network addresses, the corresponding category information including at least one meta tag;

generating a user profile based at least in part on the first identifier, corresponding category information, and at least some of the temporal information by creating a table that includes a first column for user identifiers including the first identifier, a second column for the corresponding category information including at least one meta tag, and a third column for the at least some of the temporal information;

comparing data for the user within the table to existing profiles including a first profile; and associating the user with the first profile.

13. The data processing system readable medium of claim 12, wherein the method further comprises:

selecting a first marketing information regarding an item, wherein selecting is based at least in part on the user profile; and sending the first marketing information to the user.

14. The data processing system readable medium of claim 13, wherein:

selecting is performed by a network access provider; and the first marketing information includes a banner advertisement that is to be displayed near a periphery of a view.

15. The data processing system readable medium of claim 13, wherein:

at least one of the network addresses corresponds to a network site is owned or controlled by a company that sells the item; and the first marketing information comprises an offer to sell the item.

16. The data processing system readable medium of claim 13, wherein:

selecting comprises selecting the first marketing information and a second marketing information; and the method further comprises applying a filter, wherein:

the second marketing information is filtered out and the first marketing information passes; and applying the filter is performed before sending.

17. The data processing system readable medium of claim 12, wherein the method further comprises selling the user profile.

18. The data processing system readable medium of claim 12, wherein:

accessing the second data comprises accessing the corresponding category information from a third-party source; and the corresponding category information includes meta tags for the network addresses.

19. The data processing system readable medium of claim 12, wherein comparing data for the user within the table to existing profiles includes performing click stream analysis.

20. The data processing system readable medium of claim 12, wherein comparing data for the user within the table to existing profiles includes applying data mining rules to the data for the user to determine characteristics of the user; and comparing the characteristics of the user to characteristics included in the existing profiles.

21. The data processing system readable medium of claim 12, wherein the at least one meta tag is included in code associated with at least one of the network addresses.

22. The data processing system readable medium of claim 21, wherein the category information is sorted in chronological order.

* * * * *